March 2, 1943.  H. CORDES  2,312,389
AUTOMOTIVE CRAWLER VEHICLE WITH A SCRAPER BOWL
Filed Feb. 12, 1940  3 Sheets-Sheet 1

March 2, 1943.                     H. CORDES                    2,312,389
                  AUTOMOTIVE CRAWLER VEHICLE WITH A SCRAPER BOWL
                       Filed Feb. 12, 1940          3 Sheets-Sheet 2
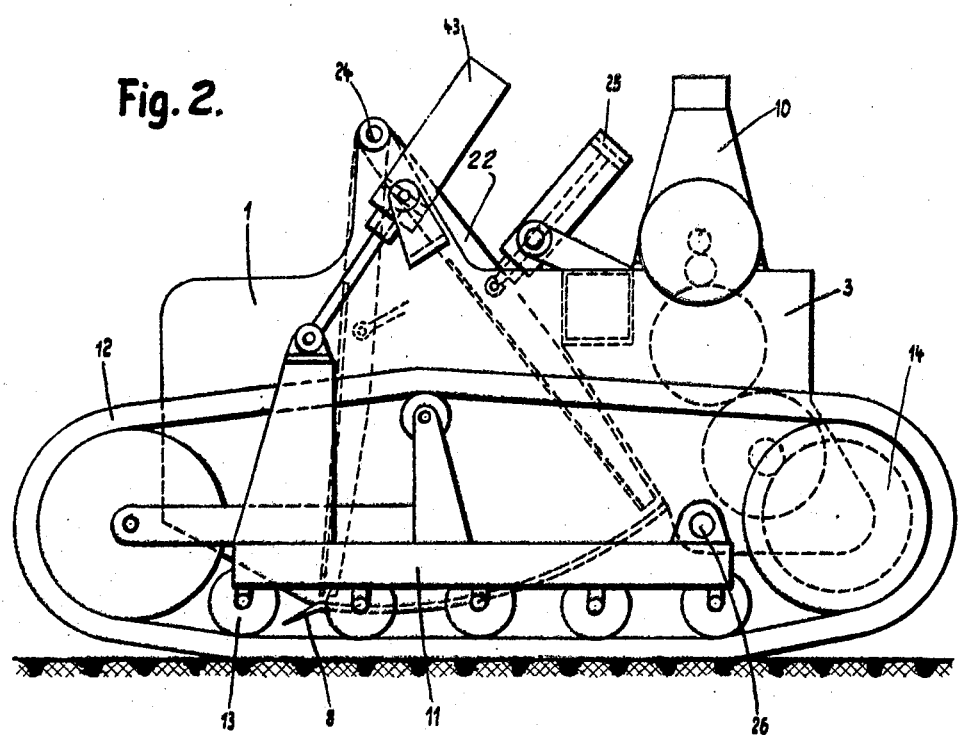
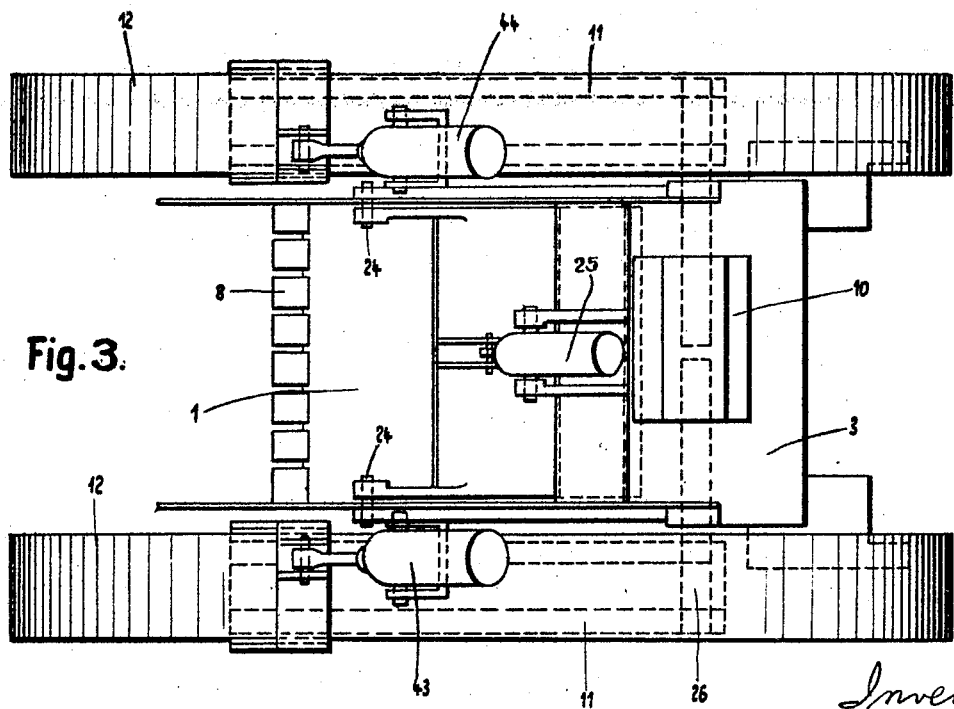

March 2, 1943.   H. CORDES   2,312,389
AUTOMOTIVE CRAWLER VEHICLE WITH A SCRAPER BOWL
Filed Feb. 12, 1940   3 Sheets-Sheet 3

Inventor,
Hugo Cordes

Patented Mar. 2, 1943

2,312,389

UNITED STATES PATENT OFFICE 2,312,389

AUTOMOTIVE CRAWLER VEHICLE WITH A SCRAPER BOWL

Hugo Cordes, Hamburg-Altona, Germany; vested in the Alien Property Custodian

Application February 12, 1940, Serial No. 318,597
In Germany February 13, 1939

1 Claim. (Cl. 37—124)

Automotive vehicles with a scraper bowl or bucket arranged in front of the crawlers, are known, but with these machines owing to the unfavourable position of the centre of gravity the scraper bowl can only be formed small in comparison to the size of the vehicle.

According to the present invention, which relates to the improvement of the known vehicles of this kind, the bowl is positioned between the crawlers of a self-propelled crawler vehicle. By means of this arrangement the bowl rests with its whole weight on the driving crawlers and offers a favourable position of centre of gravity, by which it is possible to enlarge the bowl considerably. Furthermore the adjusted cutting depth once set will practically remain the same, and will not be influenced by the staggering of the vehicle.

The crawlers may be constructed in any known way. Their frames may be connected with the frame of the vehicle by means of springs or swing on a pivot, with the bowl then being movably positioned in the vehicle. But it is also possible to connect the bowl rigidly with the frame of the vehicle and to swing the crawlers in such a way, that the cutting edge of the bowl is raised or lowered.

According to this invention motor and drive are placed behind the bowl on the side opposite to its cutting edge. Therefrom a favourable position of the centre of gravity will result, and the cutting edge, being in front of the vehicle, can be disposed so far at the end of the crawler chains, that the entering of excavated material is avoided in a much better way, than with the cutting edge situated in the centre of the vehicle.

The bowl can be constructed and suspended on the machine in different ways. Examples are shown in the accompanying drawings, viz.:

Fig. 2 shows the same construction in transporting and dumping positions.

Fig. 3 is a plan view of same.

In these drawings 1 denotes the bowl, 3 the vehicle frame, 8 the cutting edge, 10 the motor, 11 the crawler frames, 12 the crawlers, 13 the track rollers and 14 the track driving wheel.

Figure 1:
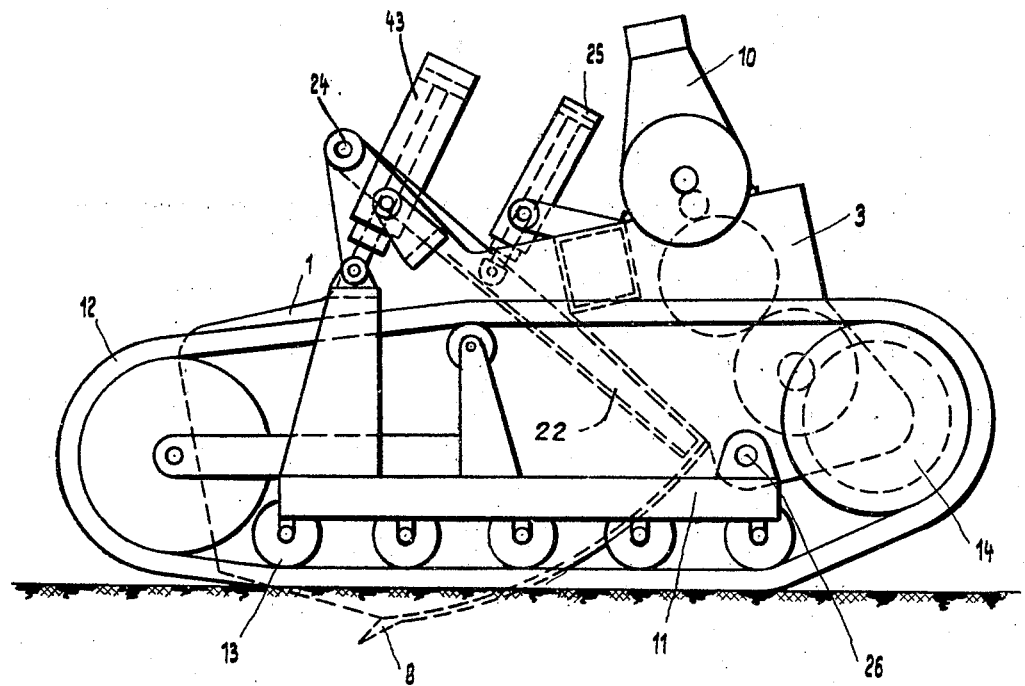
Fig. 1 shows one form of the vehicle in digging position with the bowl rigidly secured to the frame of the vehicle.

In the construction shown in Figs. 1, 2 and 3 the bowl 1, which has firm side portions, a firm bottom and a rear portion constructed as a swinging gate 22, is rigidly secured to the frame 3 and together with same it can be turned in both directions about an horizontal cross-shaft 26, by means of a drive, for instance the cylinders 43 and 44, acting on the crawler frames 11. By working these cylinders 43 and 44 the required digging depth can be adjusted and the bowl can be raised to transporting position. The swinging gate 22 is pivoted on the frame at 24 and pushes the load out over the cutting edge, as shown in Fig. 2 by dotted lines, by means of a cylinder 25 which acts between frame 3 and end gate 22.

Of course the different dumping means and the described suspensions of the bowl can be used in any other connection, without departing from the spirit of the invention. A further example of the invention is described in Figs. 4 and 5, where the two crawler frames are laterally swinging about a horizontal cross-shaft mounted on the frame. With the crawler frames swing the crawler treads, the idlers and the track rollers, while the sprocket wheels driving the chain are mounted on the frame and do not take part in the swinging movement. Hydraulic cylinders, for example, are mounted on the frame, which act on the crawler frames in such a way, that by pressing pressure fluid into the cylinders the frame will incline backwardly and that by letting off pressure fluid the opposite movement will take place; that means that the cutting edge can be lowered even below the ground.

This present form of construction of the invention only relates to such vehicles, where the movement of the crawler frames is effected by hydraulic means, the pressure fluid serving also other purposes. Thus it may be desirable that both the crawler frames are not only made to oscillate independently from each other, but that they are so connected with each other, that they are forced to oscillate in opposite directions. According to this invention therefore in a vehicle with oscillating crawler frames laterally pivoted, each of which can be turned by means of a cylinder about a horizontal cross-shaft, the pipes of the two force-cylinders will be connected. This connection can be interrupted by means of a valve, in case the oscillating motion in opposite directions of both the track frames is not required. If one of the track frames swings upwardly, the pressure fluid displaced by its piston will be transported to the other cylinder and the track frame there will be moved downwardly. Furthermore by means of a pump additional oil can be pumped into the tubes, so both the cylinders will be filled, or part of the pressure fluid can be removed, whereby both cylinders will be emptied. The pressure in both cylinders will always be the same, while the positions of the pistons will differ according to the unevenness of the ground.

Moreover the pressure oil according to invention will be used to obtain an elastic connection of both the track frames with the vehicle frame. To this end a cylinder with a compression spring pressing on a piston is connected with the pressure tube. If the pressure of the oil increases, the spring will be compressed and oil enters the cylinder. When the oil-pressure becomes less, the spring extends forcing the oil out. The spring pressure can also be put out of action, if it is not desired, as for instance during the digging process, in order to obtain an equal digging depth.

Figure 4:
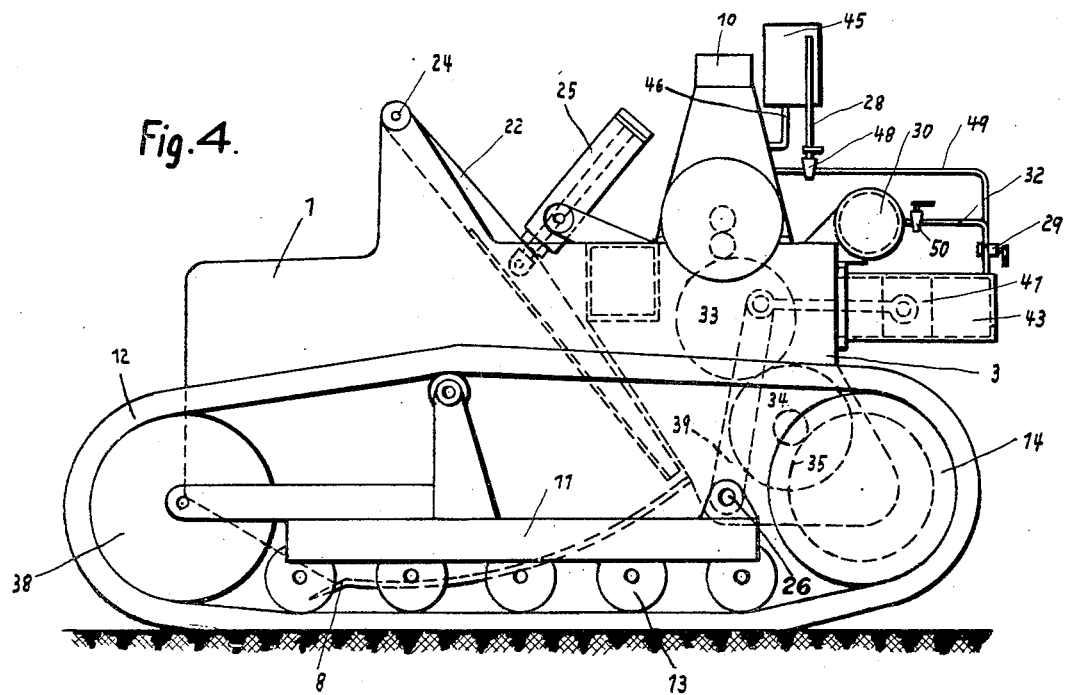
Fig. 4 is a side elevation of a second form of the invention.
Figure 5:
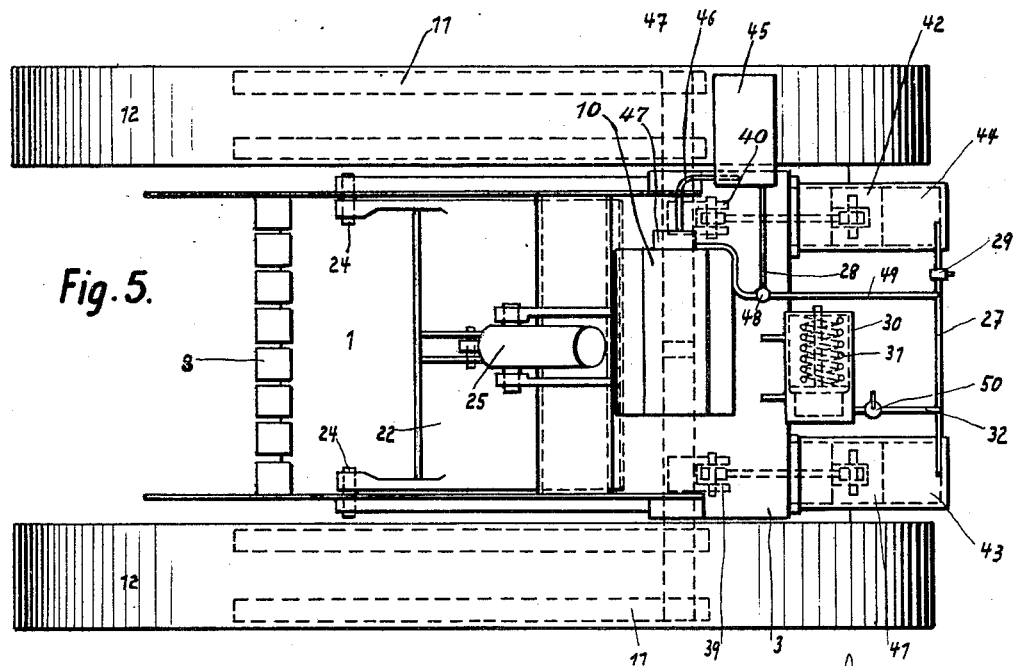
Fig. 5 is a plan view of the second form.

In the form shown in Figs. 4 and 5 there is shown at 3 the frame with bowl 1, motor 10, gear wheels 33, 34, 35 and sprocket wheel 14. The crawler frames 11 swing about cross-shaft 26 on frame 3. They carry idlers 38, track rollers 13 and tracks 12. To the track frames 11 levers 39 and 40 are fastened and connected with the pistons 41 and 42, which are working in cylinders 43 and 44 mounted on the frame 3. These cylinders, of course, may be positioned at another spot, where they may act directly on the crawler frames, which would not form a departure from the spirit of the invention. The bowl has a cutting edge 8 and the dumping gate 22, which is rotated by cylinder 25 about axis 24. The pressure fluid flows from tank 45 through piping 46 to the pump 47 driven by motor 10, and by means of valve 48 it can be pressed into cylinders 43 and 44, through pipes 49 and 27. Thereby the vehicle with the bowl will be swung about axis 26 and cutting edge 8 will be raised.

By piping 27 a permanent exchange of pressure between cylinders 43 and 44 will take place. Through piping 28 the oil can return to the tank 45 after the valve 48 has been set. The connection between the two cylinders 43 and 44 can be interrupted by means of a stop-cock 29 in the piping 27, if the oscillation of the crawler frames is not wanted. If, for instance, the vehicle is provided with a swinging crane equipment or a hoist, this possibility of interruption is desirable, otherwise the vehicle would balance over to the loading side.

Pipe 27 is in connection with the cylinder 30, containing a compression spring 31 acting on the piston, in order to transfer part of the shocks on the crawlers 12 through the oil to spring 31. Piping 32, leading to this cylinder 30, can be interrupted by means of a stop-cock 50, in order to eliminate the spring pressure, when it is not desired for instance while digging, in order to maintain an equal depth of digging.

Having thus described my invention, what I claim is:

In a device of the kind described, a vehicle frame, a scoop bowl rigidly mounted in said frame, a driving motor mounted on said frame, a pair of independent crawler track frames between which said vehicle frame is positioned, pivot means connecting said crawler track frames to said vehicle frame rearwardly of said bowl, said pivot means being arranged for independent tilting movement of the crawler frames, crawler tracks carried by said crawler track frames, track operating means connecting the engine and tracks, a pair of hydraulic cylinders carried by the vehicle frame at opposite sides thereof, each cylinder having a piston and rod, operative connections between said rods and said crawler track frames, means to supply fluid under pressure to said cylinders including a pipe connecting the cylinders, a pump, a pipe leading from the pump and connected to the first pipe, a third cylinder having a piston spring urged towards one end of the cylinder, a third pipe leading from said end to the first pipe, a stop-cock in the first pipe, and a stop-cock in the third pipe.

HUGO CORDES.